United States Patent
Forster

(10) Patent No.: US 10,922,603 B2
(45) Date of Patent: Feb. 16, 2021

(54) SECURITY DEVICE USING A THICK DIPOLE ANTENNA

(71) Applicant: AVERY DENNISON RETAIL INFORMATION SERVICES, LLC, Mentor, OH (US)

(72) Inventor: Ian J. Forster, Chelmsford (GB)

(73) Assignee: Avery Dennison Retail Information Services, LLC, Mentor, OH (US)

( * ) Notice: Subject to any disclaimer, the term of this patent is extended or adjusted under 35 U.S.C. 154(b) by 0 days.

(21) Appl. No.: 16/360,742

(22) Filed: Mar. 21, 2019

(65) Prior Publication Data

US 2019/0220725 A1   Jul. 18, 2019

Related U.S. Application Data

(62) Division of application No. 14/053,846, filed on Oct. 15, 2013, now Pat. No. 10,242,307.

(60) Provisional application No. 61/714,273, filed on Oct. 16, 2012.

(51) Int. Cl.
| | | |
|---|---|---|
| G06K 19/077 | (2006.01) | |
| H01Q 9/28 | (2006.01) | |
| H01Q 13/10 | (2006.01) | |
| H01Q 1/22 | (2006.01) | |

(52) U.S. Cl.
CPC ....... *G06K 19/07773* (2013.01); *H01Q 9/285* (2013.01); *H01Q 13/10* (2013.01); *H01Q 1/2225* (2013.01); *Y10T 29/49016* (2015.01)

(58) Field of Classification Search
CPC ......... G06K 19/0723; G06K 19/07773; G06K 7/0008; G06K 7/10316
See application file for complete search history.

(56) References Cited

U.S. PATENT DOCUMENTS

| | | | |
|---|---|---|---|
| 3,895,987 A * | 7/1975 | Loreck | B44B 5/009 156/223 |
| 5,256,721 A | 10/1993 | Wilson et al. | |
| 5,815,965 A * | 10/1998 | de Greeve | B60R 13/10 40/209 |
| 2002/0167450 A1 | 11/2002 | Korden | |
| 2003/0006901 A1 | 1/2003 | Kim et al. | |
| 2004/0008146 A1* | 1/2004 | Ikegaya | H01Q 1/22 343/767 |
| 2007/0222601 A1 | 9/2007 | Keyaki et al. | |
| 2007/0271743 A1 | 11/2007 | Chou | |
| 2008/0001836 A1* | 1/2008 | Guthrie | H01Q 13/10 343/767 |
| 2008/0042848 A1* | 2/2008 | Roberts | B60R 13/10 340/572.7 |
| 2008/0252425 A1 | 10/2008 | Okegawa et al. | |

(Continued)

FOREIGN PATENT DOCUMENTS

CN    102897112 A *    1/2013

*Primary Examiner* — Laura A Gudorf

(57) ABSTRACT

The present invention discloses a security device constructed from a material having a skin depth that is greater than about 10 times the normal skin depth for radio frequency identification device functioning in one of UHF, HF and LF frequencies. The security device of the present invention provides a more durable and robust security device that can be used in facilitating brand identification and awareness. In one embodiment the antenna material of the present invention may illustrate a wide variety of visual information.

19 Claims, 7 Drawing Sheets

(56) References Cited

U.S. PATENT DOCUMENTS

| | | |
|---|---|---|
| 2009/0021379 A1 | 1/2009 | Zhu et al. |
| 2009/0308935 A1 | 12/2009 | Sziljer et al. |
| 2010/0090015 A1* | 4/2010 | Sakama ............... H01Q 1/2225 |
| | | 235/492 |
| 2010/0148968 A1 | 6/2010 | Casden |
| 2010/0277279 A1* | 11/2010 | Kim ................ G06K 19/07309 |
| | | 340/5.85 |
| 2010/0321255 A1 | 12/2010 | Kough |
| 2011/0248830 A1 | 10/2011 | Jeppesen |
| 2012/0031979 A1 | 2/2012 | Kang |

* cited by examiner

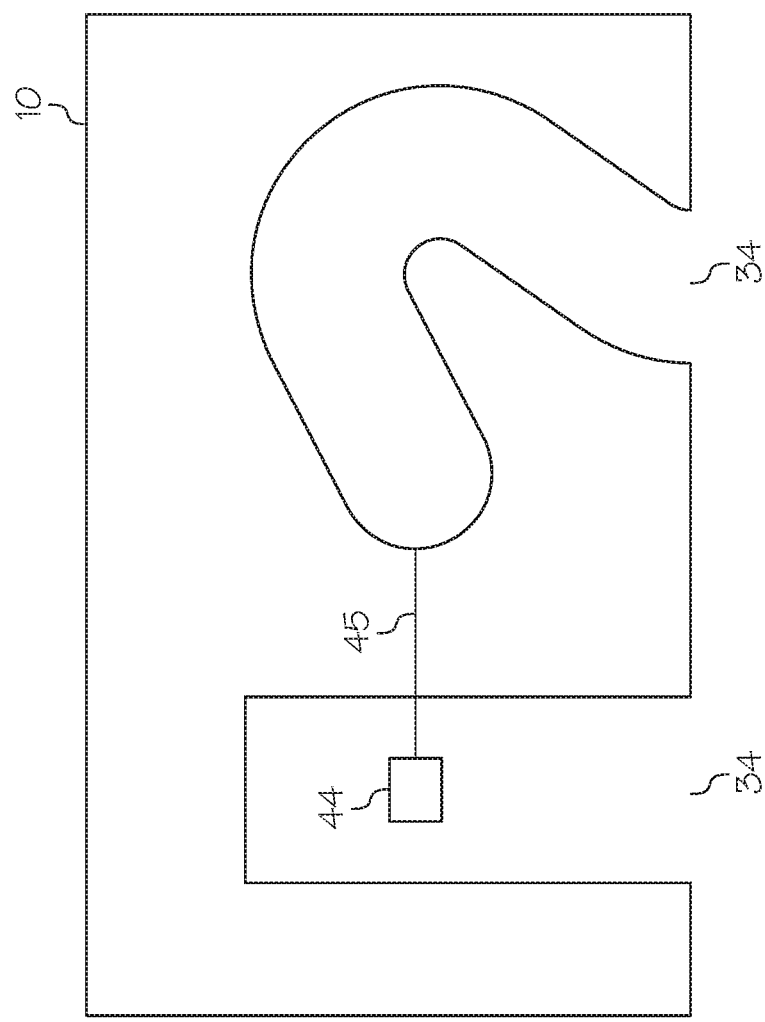

SECURITY DEVICE USING A THICK DIPOLE ANTENNA

CROSS-REFERENCE TO RELATED APPLICATION(S)

The present application claims priority to and the benefit of U.S. Utility patent application Ser. No. 14/053,846 filed Oct. 15, 2013 and U.S. Provisional Application No. 61/714,273 filed Oct. 16, 2012, each of which is incorporated by herein by reference in its entirety.

FIELD OF THE INVENTION

The present invention relates to security devices. More specifically, the present invention relates to a security device having a radio frequency identification ("RFID") device that operates by utilizing an antenna that is substantially thicker than conventional antennas required in order for the RFID device to function.

BACKGROUND OF THE INVENTION

A common problem at retail stores is shoplifting, and various types of security devices are utilized by retailers to aid in alleviating this problem. A common objective of retailers is to utilize security devices that can be produced at a low cost while maintaining efficiency. An overwhelming issue facing retailers is that security devices capable of being produced at a lower cost are often ones that are easily defeated by experienced shoplifters. Those devices that are produced at a lower cost may not even effectively operate or worse may simply be ignored by the sales staff if an alarm is triggered.

A security device may consist of a radio frequency identification device (RFID) that will contain an integrated circuit (chip) for storing and processing information, modulating and demodulating a radio-frequency signal and other specialized functions. A RFID device will also typically include an antenna or a plurality of antennas in addition to the integrated circuit for receiving and transmitting RF signals. A RFID reader is utilized to read and process the information stored on a chip of the RFID device and may be utilized in order to encode information to the chip of the RFID device.

In a typical RFID device, such as a RFID inlay or a RFID tag or label, a chip is connected to an antenna which is provided on a substrate. The conductor for an antenna in an RFID device is normally chosen to be greater than one (1) skin depth at the operating frequency, but is rarely greater than 10 times skin depth because it does not enhance an RFID antenna response. In addition materials and their relative thickness are also chosen for reasons of cost and flexibility. In order to provide a stronger security device that is not easily defeated, such as one that may be placed on the exterior of a shipping container, pallet or as party of a security tag, a typical RFID device is often encased in an injection molded case or inserted into a pre-formed housing to form a rigid, protective enclosure. However, this method can be extremely costly, time consuming and therefore not particularly desirable to manufacturers. RFID tags and inlays today may have a thickness ranging from about 10 mils to about 15 mils. The addition of a paper covering, such as when the RFID device makes up part of a label or tag, may increase the thickness of the device that is delivered to a customer, but such additional material does not generally provide any further functional performance to the RFID inlay itself.

Thus, there exists a need in the marketplace for a security device that is not easily defeated, which may aid the marketer or retailer in increasing security and/or brand awareness. Additionally, it would be beneficial to produce a tag having the previously mentioned characteristics that is also aesthetically pleasing to the consumer and possesses a reusability option, a tag that can be used multiple times. Additionally, retailers may desire to provide a security device that serves as a marketing opportunity for their company. For instance a company may want to provide a security device that showcases a trademark or trade dress of the company that may be reused by a consumer independently from the purchased item further fostering brand awareness or other promotional activity.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The present invention provides a security device constructed out of rigid, conductive material that is able to resist removal through use of a physical force such as cutting, ripping, and/or tearing. This may be accomplished by providing a thick substrate having an opening in the conductive material with the opening having an open and closed end with the closed end extending into an area of the conductive material. The conductive material having the opening that defines an antenna, more typically a dipole antenna. The security device further includes a chip and/or strap within or positioned above the opening forming a RFID security device.

The present invention contemplates that the antenna material may be formed into a plurality of geometric shapes, or may take on a configuration of a trademark, symbol, commemorative element, figurine or other configuration relating to a promotional or marketing event or theme, e.g. such as a football helmet, animal, sports apparatus, or the like.

In accordance with one embodiment of the present invention, the present invention provides a method of constructing a security device from thick materials with an opening cut in a piece of antenna material. The opening has an open and closed end, and a chip is attached in between first and second sides of the open end of the opening.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which:

FIG. 5 depicts an embodiment of the present invention where the security device comprises more than one antenna;

DETAILED DESCRIPTION OF THE INVENTION

The present invention is now illustrated in greater detail by way of the following detailed description which represents the best presently known mode of carrying out the invention. However, it should be understood that this description is not to be used to limit the present invention, but rather, is provided for the purpose of illustrating the general features of the invention.

The term "skin depth" as used herein refers to a measure of the distance an alternating current can penetrate beneath the surface of a conductor so that the current density near the surface of the conductor is greater than at its core. That is, the electric current tends to flow at the skin or surface of the conductor at an average depth, called "skin depth." Skin depth is a property of the material that varies with the frequency of an applied wave and can be calculated from the relative permittivity and conductivity of the material and frequency of the wave. For example the skin depth of certain materials at a frequency of 10 GHz expressed in micrometers is as follows:

| Conductor | Skin Depth |
| --- | --- |
| Aluminum | 0.8 |
| Copper | 0.65 |
| Gold | 0.79 |
| Silver | 0.64 |

The skin depth of a material can vary at different frequencies, for example the following chart shows the skin depth of copper at various frequencies and again the measurement is expressed micrometers:

| Frequency | Skin depth |
| --- | --- |
| 60 Hz | 8470 |
| 10 kHz | 660 |
| 100 kHz | 210 |
| 1 MHz | 66 |
| 10 MHz | 21 |

If the resistivity of aluminum is taken as $2.8 \times 10^{-8}$ $\Omega$m and its relative permeability is 1, then the skin depth at a frequency of 50 Hz is given by:

$$\delta = 503 \sqrt{\frac{2.82 \cdot 10^{-8}}{1 \cdot 50}} = 11.9 \text{ mm}$$

Iron has a higher resistivity, $1.0 \times 10^{-7}$ $\Omega$m, and this will increase the skin depth. However, its relative permeability is typically 90, which will have the opposite effect. At 50 Hz the skin depth in iron is given by:

$$\delta = 503 \sqrt{\frac{1.0 \cdot 10^{-7}}{90 \cdot 50}} = 2.4 \text{ mm}$$

Hence, the higher magnetic permeability of iron more than compensates for the lower resistivity of aluminum and the skin depth in iron is therefore five (5) times smaller. This will be true whatever the frequency, assuming the material properties are not themselves frequency-dependent.

In the present invention, the material that is selected for use for the RFID device will have a skin depth typically greater than 10 times the skin depth required for a typical RFID device operating in one of ultra high frequency (UHF), high frequency (HF) or low frequency (LF). In other embodiments, the material may have a skin depth of 15 times the skin depth of a typical RFID device, 20 times greater, 25 times greater, 30 times greater, 50 times greater, 100 times greater or more, than a conventional RFID device, e.g. one in which the substrate is paper or plastic film, and the thickness is 10 to 15 mils.

Figure 1:
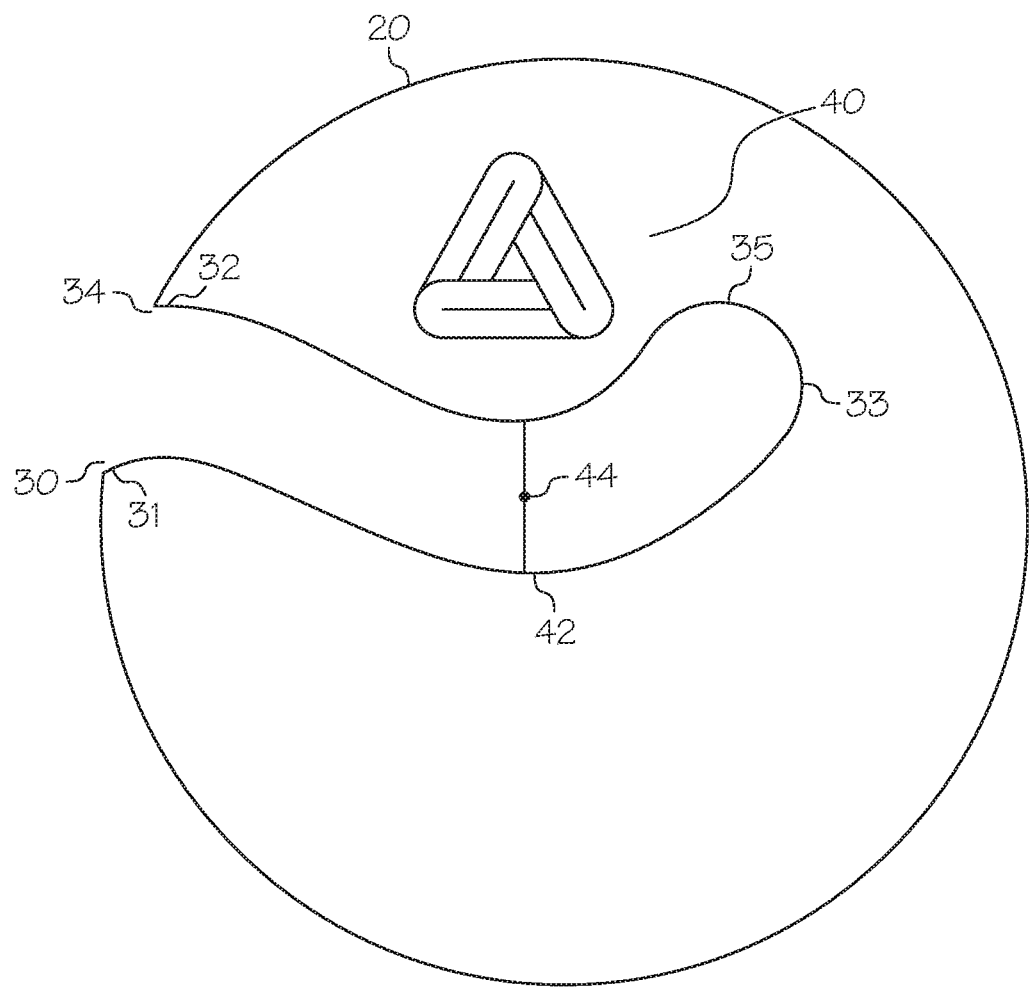
FIG. 1 depicts a security device of the present invention showing branding information pertaining to a company.
Figure 2:
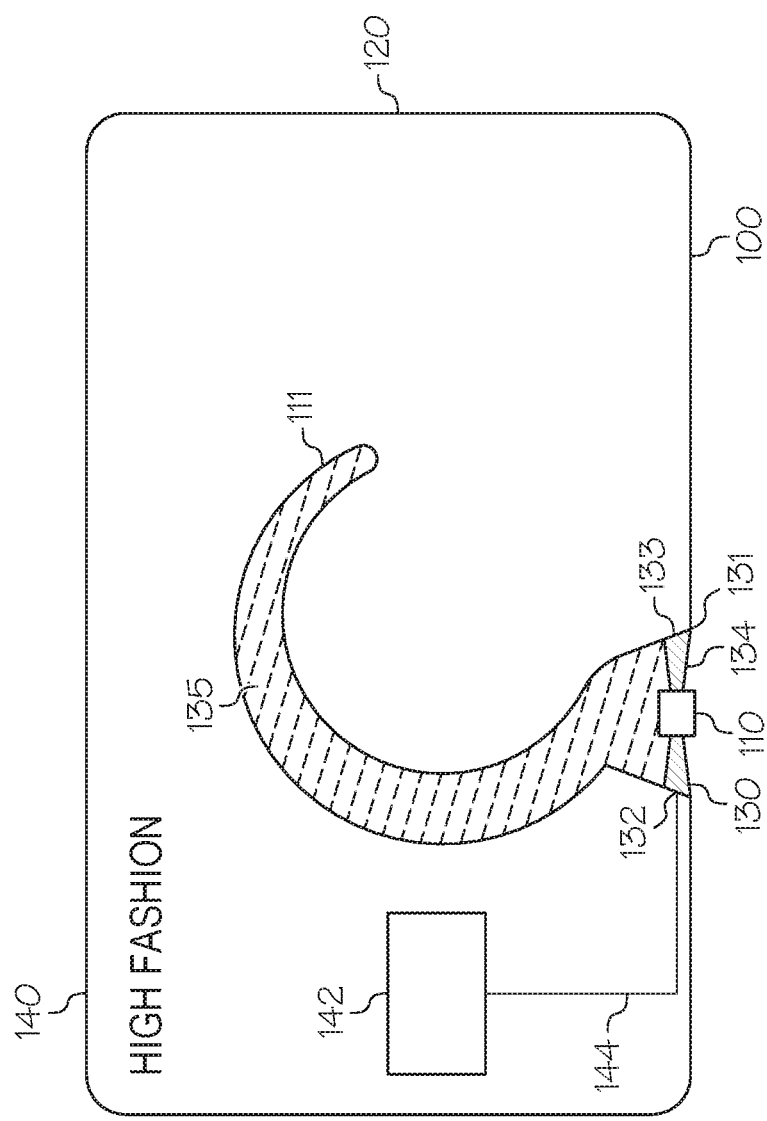
FIG. 2 illustrates another embodiment of the present invention where the security device utilizes a different geometric shape.

In reference to the figures, and initially to FIG. 1, a security device 10 is depicted having an antenna constructed out of a conductive material, such as aluminum is provided. The antenna material has a perimeter 20 and an opening 30. More specifically, the opening 30 which can also be referred to as a slot, aperture, or the like, has an open end 34 extending inwardly from the perimeter 20 of the antenna material toward the central or body portion of the antenna material. The open end 34 has a first side or edge 31 and a second 32 side or edge. The closed end 33 also has a closed portion 35 which terminates in an area of the antenna material inset from the perimeter 20, that is more centrally disposed. The opening 30 contemplated by the present invention may take many shapes and have a number of sizes or dimensions, e.g. length/width. For instance the opening may be cut into a serpentine shape, with a number of back and forth segments, or the opening may resemble a question mark as illustrated in FIG. 2. The opening in the antenna material defines a gap for a chip or strap to create a dipole antenna for a RFID device. The antenna created by the opening may be any type of antenna such as a dipole, loop, or slot antenna. The present invention also contemplates that the antenna material may have more than one opening 30 and may define more than one antenna. The security device 10 may further include an integrated circuit or chip 44 that is placed in between the first 31 and second 32 sides of the open end 34 of the opening 30. Bridging the opening 30 is a strap 42 having an integrated circuit 44.

FIG. 2 illustrates a security device 100 having a strap 131 to facilitate a connection between the integrated circuit 130 and the first side 132 and the second side 132 of the open end 134 of the opening 130 in the perimeter 120. The opening

130 may be filled with a dielectric material 135, such as foam, rubber or other suitable material so as to protect the chip 110 from being prematurely removed or disabled as well as to prevent the opening from becoming clogged with other material that might impact performance of the device and to avoid the device from being caught on other exposed surfaces.

FIG. 2 also provides that the branding information 140 can be presented in the form of human readable indicia. FIG. 2 also provides a sensor 142 which is connected 144 to the chip 110. The sensor 142 can allow the chip to communicate the change in certain environmental conditions such as temperature and humidity or can be used to detect potential tampering or removal of the chip.

The present invention contemplates that the antenna material may illustrate visual information 40, for example, relating to a company logo, trademark, trade name, theme, promotion, marketing or political campaign, commemorative activity or the like. In one embodiment, the company information is etched into the antenna material via a laser cutter. In another embodiment, an adhesive label containing visual information may be adhered to the antenna material. Additionally, visual information may be applied to the antenna material by embossing or forming a depression and filling the depression with a colored paint or ink. Other suitable methods may also be used in providing the branding or marketing information such as printing, painting, coating, abrasion, laminating and the like.

Depending on the visual information's desirability to a consumer that is provided on the antenna material, the security device 10 (FIG. 1) of the present invention may be retained by a consumer independent of an article after deactivation and removal of the security device 10 from an article to which it is attached. For example, the customer may retain the item as a collectible or memorabilia. In addition, such a security device 10 may provide the retailer or provider of the device with an additional sale opportunity, as the customer may request to purchase the device 10 at the time of purchasing the article to which the device 10 has been attached. The present invention contemplates that the security device of the present invention may serve other purposes relating to its aesthetic qualities rather than a security function, for example the device 10 can be used as part of a fastener, such as a zipper on a garment, part of a drawstring, snap, closure or other garment accessories, further enhancing the brand recognition or collectible nature of the particular tag.

One potential concern that consumers may have in relation to a security device possessing RFID functionality relates to privacy and whether or not the consumer may be tracked via the RFID device after purchase. Upon deactivation of the security device 10, such as at the point of check out, a consumer's privacy concerns should be eliminated, as the RFID device will no longer function and will no longer possess the capability to transmit information thereby preventing "tracking" of the individual or item associated with the security device.

The security device of the present invention may be deactivated by cutting or removing the chip from the gap in the antenna material, folding the antenna material in any variety of directions to break the connection if the chip with the antenna, or by subjecting the RFID device to a magnet. Deactivation inhibits the functionality of the RFID device.

The antenna material of the present invention may be any type of conductive material that can provide the functional performance for a RFID device contemplated by the present invention. In one exemplary embodiment the antenna material is aluminum, steel, copper or another type of conductive material. In an additional embodiment, the antenna material may have a thickness of equal to or greater than 2 mm. The antenna material of the present invention may be provided in one single layer, a laminate or multiple layers which together achieve a specified thickness. A shoplifter who attempts to steal an article attached to a security device having a thicker antenna than those disclosed in the prior art, will potentially inflict greater damage on the article thus defeating the thief's objective as more force will be required to remove the security device.

In one embodiment of the present invention, a first and second material are used to form an antenna. The first material may be a type of conductive material, the second material may be a conductive material, or both the first and second antenna material may be a type of conductive material.

The opening 30 (FIG. 1) defines an antenna which in a preferred embodiment is a dipole antenna, which can be referred to as a "sloop antenna." A dipole antenna that is constructed out of an antenna material that is substantially thicker than the antenna material disclosed in the prior art is an important characteristic of the present invention.

The present invention contemplates that the security device 10 may further include or be otherwise associated with a fastener mechanism such as a pin and clutch or other types of fastener mechanisms commonly used in the art. Through the inclusion of additional security devices, further security measures can be added and to allow an article to be protected in multiple ways.

Figure 6:
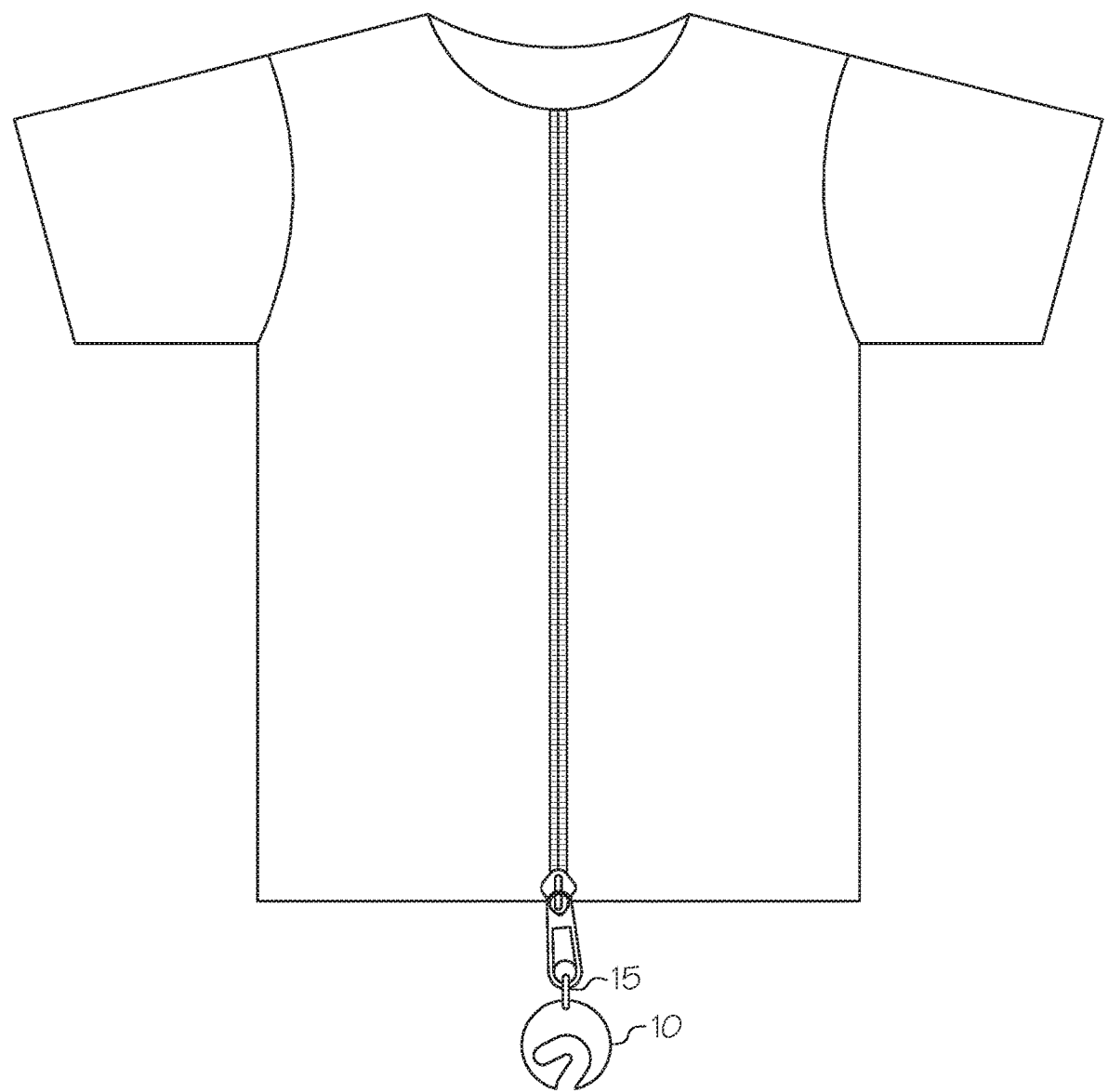
FIG. 6 illustrates the security device fixed to a garment by a lanyard.

FIG. 6 illustrates one embodiment where the security device 10 of the present invention is attached to an article by a lanyard 15 that may be looped through or around a portion of an article so as to further connect the security device to the article.

Figure 4A:
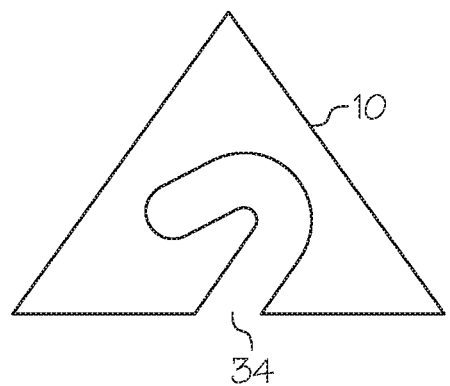
FIG. 4A and FIG. 4B illustrate security devices of the present invention that utilize geometric shapes contemplated by the present invention.
Figure 4B:
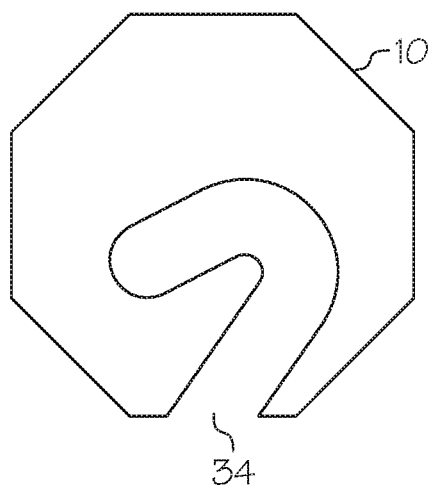
Figure 4C:
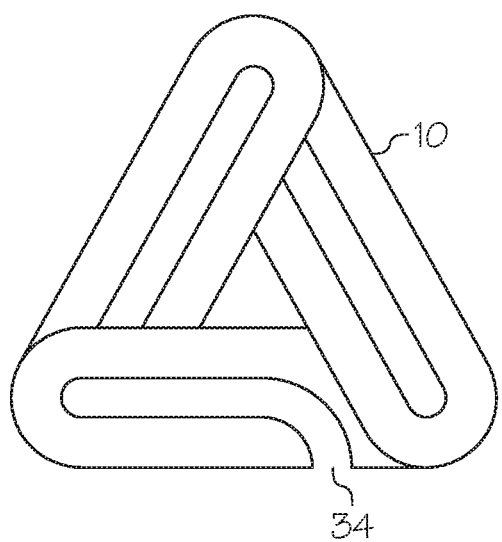
FIG. 4C illustrates a security device of the present invention in a trademark configuration.

In one embodiment of the present invention, the security device 10 of the present invention may be shaped into a variety of geometric shapes i.e. circle, square, rectangle, triangle, hexagon, pentagon, trapezoid, etc. The antenna material or blank of material to be used to create the antenna may be formed into shape by cutting, milling, punching, stamping, spark erosion or laser ablation. FIG. 1 illustrates a security device 10 of the present invention having a circular geometric shape. FIG. 2 illustrates a security device 10 of the present invention having a rectangular shape. FIGS. 4a-4b shows the security device 10 having a triangular and octagonal shape respectively. FIG. 4c illustrates the security device 10 in the shape of a company's trademark, such as the Avery Dennison Corporation logo.

Figure 3:
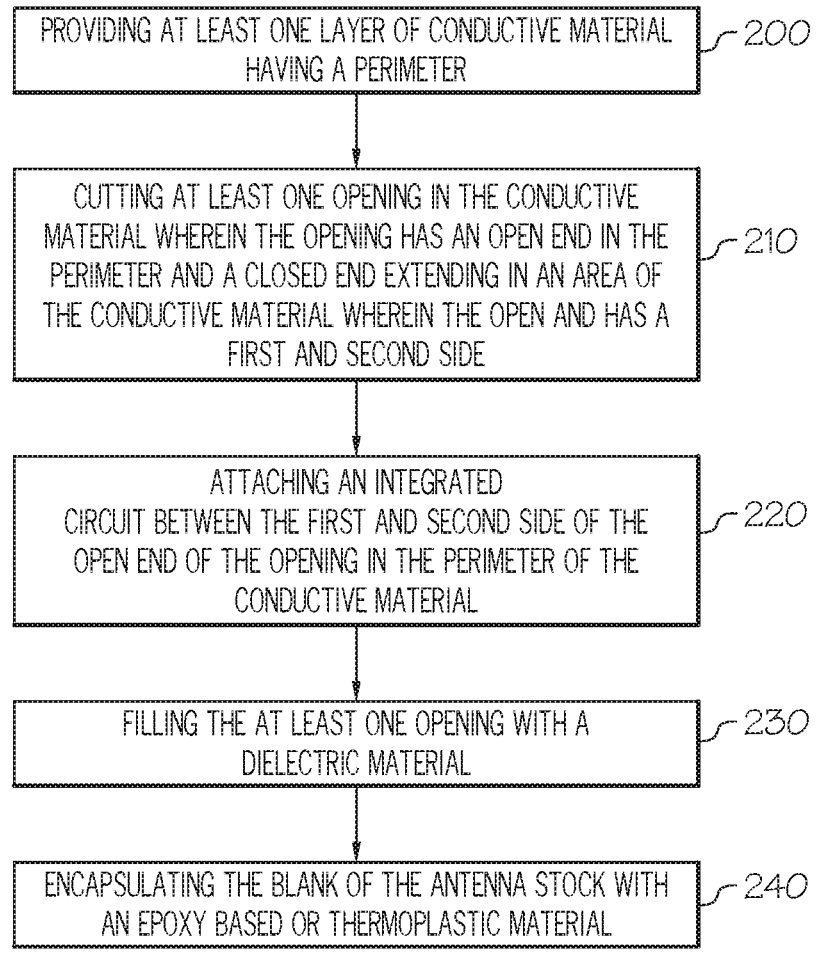
FIG. 3 provides a flow diagram of an exemplary method of making a security device of the present invention.

FIG. 3 depicts a method of constructing a security device 10 of the present invention. First, at least one layer or blank of conductive material having a perimeter 20 (200). Second at step (210), at least one opening 30 is cut into the conductive material such that the opening 30 extends inwardly from the perimeter to define an open end 34 in the perimeter or side edge of the blank. The opening has first 31 and second 32 sides and a closed end 33 extending into an area, central area or the interior of the blank inset from the perimeter of the antenna material. Third, at step (220), an integrated circuit 130 is attached between the first 31 and second 32 side of the open end of the opening 30. Fourth, at step (230) the at least one opening 30 is filled in with a dielectric material 135. Lastly, at step (240) the blank of antenna stock is encapsulated with either an epoxy based or thermoplastic material.

In one embodiment of the present invention, a strap may be positioned at variable positions in the present invention depending on the particular performance required for the device. For example, a strap in the form of a loop having both magnetic and electric field may be positioned so that the magnetic field coupling can be relatively high near the closed 33 end of the opening 30.

Figure 7A:
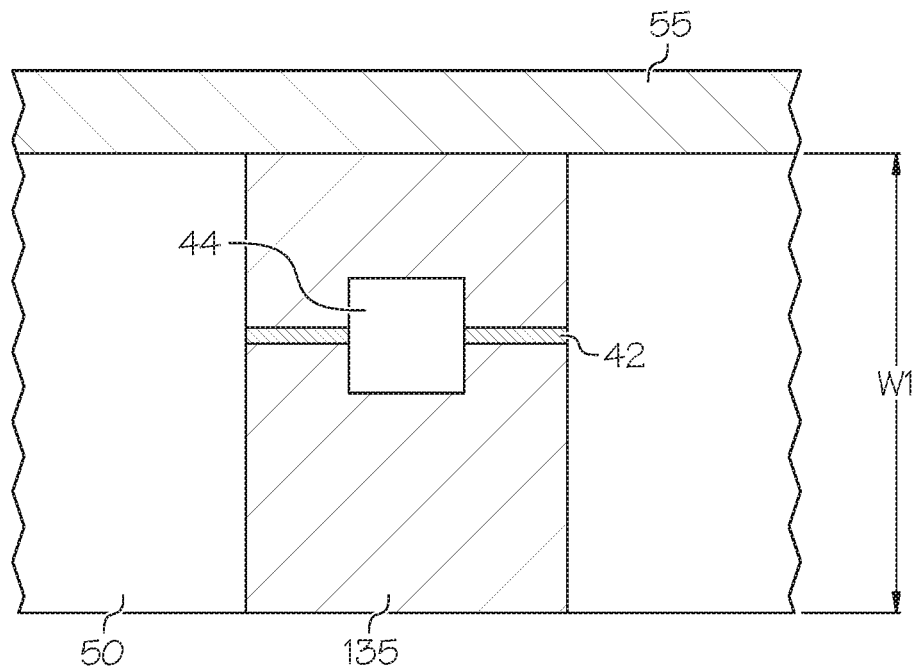
FIG. 7A provides a cross sectional view of the security device of the present invention.
Figure 7B:
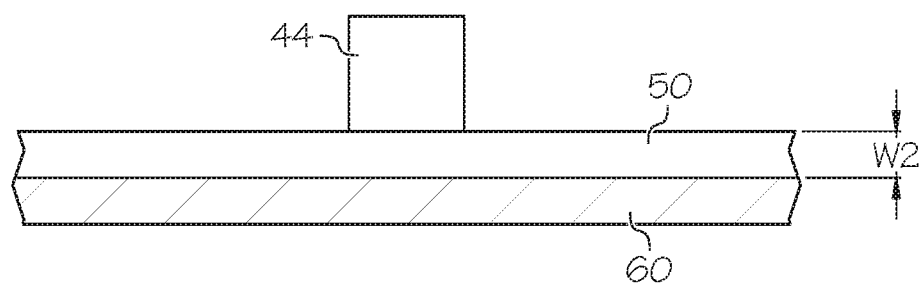
FIG. 7B provides a cross sectional view of a conventional RFID device.

In one embodiment, in order to make the security tag more robust, the opening 30 may be filled with a suitable material such as a thermoplastic by injecting a dielectric material into the opening, or by encapsulation of the blank of antenna stock with an epoxy based material by coating. FIG. 7a shows a side view of the security device with a chip 44 connected by a strap 42 to the antenna material 50, the antenna material has a skin depth W1. The chip 44 is encapsulated in a dielectric material 135 and the antenna material 50 coated by an epoxy based material 55. FIG. 7b depicts a conventional RFID construction, where the chip 44 is fixed to an antenna material 50 with a skin depth W2 which is printed onto a substrate material 60.

In yet another embodiment contemplated by the present invention, in order to obtain good RFID performance including good conductivity and low relative magnetic permeability, and mechanical strength, these features may not be achieved by use of a single material, and as such laminated or plated metals may be used in combination with other materials. For instance, steel may be used because of its great strength and relatively low thickness, but it is a poor choice for an RFID antenna due its magnetic conductive properties. However, a composite with a >1 skin depth of copper plated onto steel, will provide antenna material that will provide a better performance at a lower cost than using a blank composed completely of copper.

FIG. 5 illustrates an embodiment of the present invention, showing a plurality of openings in the antenna material which may define other types of antennas besides a dipole antenna such as a tripole or a hybrid antenna. Providing multiple antennas on a single blank and then connecting those antennas to the integrated circuit 44 either directly by connector 45 or indirectly by alternative means can be used to provide a device that can operate in other communication environments. The blank of material may also include a sensor that can be connected to the antenna to signal exposure to a particular environmental event such as temperature or humidity, or for use in detecting tampering or other security related issues.

Even though the present invention discusses the use of the invention described herein in accordance with a RFID device, it is also contemplated that the invention disclosed may be viewed solely for its potential usage as an independent antenna. It is also contemplated by the present invention, that the invention may be utilized as a "dummy" security device, which resembles a security device for deterrence reasons but does not actually function, that is the device cannot be read by a reader or used to track the item.

It will thus be seen according to the present invention a highly advantageous security device with a thicker dipole antenna has been provided. While the invention has been described in connection with what is presently considered to be the most practical and preferred embodiment, it will be apparent to those of ordinary skill in the art that the invention is not to be limited to the disclosed embodiment, and that many modifications and equivalent arrangements may be made thereof within the scope of the invention, which scope is to be accorded the broadest interpretation of the appended claims so as to encompass all equivalent structures and products.

The inventors hereby state their intent to rely on the Doctrine of Equivalents to determine and assess the reasonably fair scope of their invention as it pertains to any apparatus, system, method or article not materially departing from but outside the literal scope of the invention as set out in the following claims.

What is claimed is:

1. A security device having a radio frequency identification device (RFID) comprising:
   a substantially rigid material for use in forming an antenna having a perimeter and at least one opening with at least one series of back and forth segments formed in the material, the opening having an open end in the perimeter and extending inwardly from the perimeter and a closed end that terminates in an area of the material away from the perimeter wherein the opening has a first side and a second side;
   visual information is applied to the material;
   an integrated circuit disposed between the first and second side of the opening so that the magnetic field coupling is relatively high near the closed end of the opening; and
   wherein the material has a skin depth greater than 10 times the skin depth required for radio frequency purposes in one of UHF, HF or LF and the at least one opening filled with a thermoplastic material forms an antenna for use with an RFID device and the material has branding or promotional information on at least one side of the material.

2. The security device of claim 1, where the closed end also has a closed portion which terminates in an area of the antenna material inset from the perimeter.

3. The security device of claim 1, where the security device is selected from the group consisting of a circle, square, rectangle, triangle hexagon, pentagon, and trapezoid.

4. The security device of claim 2, where the antenna material inset from the perimeter is centrally disposed.

5. The security device of claim 1, where the information is etched into the antenna material via a laser cutter.

6. The security device of claim 1, where the information is applied to the antenna material by embossing/forming a depression.

7. The security device of claim 6, where the depression is filled with a colored paint or ink.

8. The security device of claim 1, where the security device further comprises a fastener mechanism.

9. The security device of claim 1, where the security device further comprises a lanyard.

10. A security device having a radio frequency identification device (RFID) attached to an article wherein the security device comprises:
    a blank of conductive material for use in forming an antenna having a perimeter;
    a plurality of openings formed in the conductive material, at least one of the openings having an open end in the perimeter and extending inwardly from the perimeter and a closed end that terminates in an area of the material away from the perimeter wherein the opening has a first side and a second side and the at least one opening is injected with a dielectric material such that each opening forms a distinct antenna other than a dipole antenna;
    an integrated circuit disposed between the first and second side of the opening wherein the integrated circuit is attached between the first and second side of the opening with a strap and the strap is positioned so that the magnetic field coupling is relatively high near the closed end of the opening; and wherein the material has a skin depth greater than 20 times the skin depth required for radio frequency purposes in one of UHF, HF or LF and the at least one opening forms an antenna for use with an RFID device wherein the antenna material contains a plurality of openings, wherein each opening forms a distinct antenna; and where the security device may be deactivated.

11. The security device of claim 10, where the security is selected from the group consisting of a circle, square, rectangle, triangle hexagon, pentagon, and trapezoid.

12. The security device of claim 10, where the antenna material is a laminate or comprises multiple layers which together achieve a specified thickness.

13. The security device claim 10, where the antenna material thickness is equal to or greater than 2 mm.

14. The security device of claim 10, where the security device is in the shape of a company's trademark.

15. A method of constructing a radio frequency identification (RFID) security device comprising the steps of:
   providing a conductive material having a perimeter and an integrated circuit, the conductive material having a skin depth greater than 10 times the skin depth required for radio frequency purposes in one of UHF, HF or LF;
   producing branding or promotional information on the material;
   cutting at least one opening in the conductive material, and the opening has an open end in the perimeter and a closed end centrally disposed extending in an area of the conductive material inwardly from the perimeter and the opening has a first and second side;
   injecting the at least one opening with a thermoplastic material;
   attaching the integrated circuit between the first and second side of the opening with a strap to form the RFID device;
   filling the at least one opening with a dielectric material; and
   providing multiple antennas on a single blank and then connecting said antennas to the integrated circuit.

16. The method of constructing a radio frequency identification (RFID) security device of claim 15, further including a step where the blank of antenna stock is encapsulated with either an epoxy based or thermoplastic material.

17. The method of constructing a radio frequency identification (RFID) security device of claim 15, further including positioning the strap so that the magnetic field coupling is relatively high near the closed end of the opening.

18. The method of constructing a radio frequency identification (RFID) security device of claim 15, further including the step of coating the antenna material by an epoxy based material.

19. The method of constructing a radio frequency identification (RFID) security device of claim 15, further including using a composite with a >1 skin depth of copper plated onto steel as the material.

\* \* \* \* \*